(12) United States Patent
Awaida et al.

(10) Patent No.: US 8,438,008 B2
(45) Date of Patent: May 7, 2013

(54) METHOD OF GENERATING A TRANSLITERATION FONT

(75) Inventors: Sameh Awaida, Dhahran (SA); Husni Al-Muhtaseb, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 374 days.

(21) Appl. No.: 12/849,751

(22) Filed: Aug. 3, 2010

(65) Prior Publication Data

US 2012/0035910 A1    Feb. 9, 2012

(51) Int. Cl.
*G06F 17/20* (2006.01)
*G06F 17/28* (2006.01)

(52) U.S. Cl.
USPC ............................. 704/8; 704/2; 704/3; 704/7

(58) Field of Classification Search ................... 704/2–8
See application file for complete search history.

(56) References Cited

U.S. PATENT DOCUMENTS

| | | | |
|---|---|---|---|
| 2,074,216 A | 3/1937 | Govil | |
| 3,426,451 A | 2/1969 | Hoffmann | |
| D255,804 S | 7/1980 | James, Sr. | |
| D269,281 S | 6/1983 | Hankes | |
| 4,680,710 A | 7/1987 | Kizilbash | |
| 5,136,504 A * | 8/1992 | Fushimoto | 704/10 |
| 5,137,383 A | 8/1992 | Wong | |
| 5,164,900 A * | 11/1992 | Bernath | 715/264 |
| D331,419 S | 12/1992 | Chang et al. | |
| 5,197,810 A | 3/1993 | Zhang et al. | |
| D385,907 S | 11/1997 | Jacobi, Jr. | |
| D405,463 S | 2/1999 | Martinetti | |
| D435,584 S | 12/2000 | Abulhab | |
| 6,292,164 B2 * | 9/2001 | Soohoo | 345/660 |
| D477,354 S | 7/2003 | Leu | |
| D496,392 S | 9/2004 | Matteson et al. | |
| 6,950,986 B1 | 9/2005 | Jacobi, Jr. et al. | |
| 7,177,794 B2 | 2/2007 | Mani et al. | |
| D556,206 S | 11/2007 | Pletikosa et al. | |
| 7,403,888 B1 * | 7/2008 | Wang et al. | 704/2 |
| 7,797,152 B1 * | 9/2010 | Waite et al. | 704/9 |
| 2004/0236581 A1 * | 11/2004 | Ju et al. | 704/276 |

FOREIGN PATENT DOCUMENTS

| | | |
|---|---|---|
| WO | WO2008109769 (A1) | 9/2008 |
| WO | WO2009092139 (A1) | 7/2009 |

* cited by examiner

*Primary Examiner* — Jesse Pullias
(74) *Attorney, Agent, or Firm* — Richard C. Litman

(57) ABSTRACT

The method of generating a transliteration font allows for the generation and display of a word in a transliteration font, the word including at least one character displayed in an alphabet of a first language, and the transliteration font including at least one embedded character representing a phonetic pronunciation of the word in an alphabet of a second language.

15 Claims, 2 Drawing Sheets

METHOD OF GENERATING A TRANSLITERATION FONT

BACKGROUND OF THE INVENTION

1. Field of the Invention

The present invention relates to screen fonts for a computer or other electronic screen, display, or monitor, and particularly to a method of generating a transliteration font that is capable of displaying a word that has at least one character in an alphabet of a first language in a transliteration font that includes at least one embedded character representing a phonetic pronunciation of the word in the alphabet of a second language.

2. Description of the Related Art

Transliteration is the practice of converting a text from one writing system into another in a systematic way. From an information-theoretical point of view, transliteration is a mapping from one system of writing into another, word-by-word, or ideally letter-by-letter. Transliteration attempts to use a one-to-one correspondence and be exact, so that an informed reader should be able to reconstruct the original spelling of unknown transliterated words. To achieve this objective, transliteration may define complex conventions for dealing with letters in a source script, which do not correspond with letters in a goal script.

Transliteration is opposed to transcription, which specifically maps the sounds of one language to the best matching script of another language. Still, most systems of transliteration map the letters of the source script to letters pronounced similarly in the goal script for some specific pair of source and goal language. If the relations between letters and sounds are similar in both languages, a transliteration may be (almost) the same as a transcription. In practice, there are also some mixed transliteration/transcription systems that transliterate a part of the original script and transcribe the rest.

Transcription, in the linguistic sense, is the conversion of a representation of language into another representation of language, usually in the same language but in a different form. Transcription should not be confused with translation, which, in linguistics, usually means converting from one language to another, such as from English to Spanish. The most common type of transcription is from a spoken-language source into text, such as a computer file suitable for printing as a document, such as a report. Common examples are the proceedings of a court hearing such as a criminal trial (by a court reporter) or a physician's recorded voice notes (medical transcription).

Other types of transcription include the conversion of sign language or braille to text or vice versa. Transcription can also mean the conversion of a written source into another medium, such as by the optical scanning of books into digital versions that can be then be presented in other forms such as in electronic books or as speech. In a strict linguistic sense, transcription is the process of matching the sounds of human speech to special written symbols using a set of exact rules so that these sounds can be reproduced later.

Both transcription and common transliteration convert words or characters from one visual form into another. In order for a native English speaker, for example, to read Arabic (when the English speaker has no prior knowledge of Arabic), one or more Arabic words may be transliterated into phonetic equivalents (written in English characters). This, however, removes the original character set from the wording. Thus, a native speaker of Arabic (with no knowledge of English) would not be able to read the transliterated words.

It would be desirable to be able to generate words and, specifically, characters, which can be read by speakers of both a primary language and a secondary language. Thus, a method of generating a transliteration font solving the aforementioned problems is desired.

SUMMARY OF THE INVENTION

The method of generating a transliteration font relates to the generation and display of characters on a display associated with a computer or other electronic display. Particularly, the method relates to the generation of a word in a transliteration font so that a word including at least one character displayed in an alphabet associated with a first language is transformed to a transliteration font including at least one embedded character representing a phonetic pronunciation of the word in an alphabet associated with a second language.

The method includes the following steps: (a) generating a transliteration database including at least first and second data sets, where the first data set includes graphic representations of characters of an alphabet of the first language and phonetic data representing phonetic pronunciations associated with each of the characters of the alphabet of the first language, and the second data set includes graphic representations of characters of an alphabet of a second language and phonetic data representing phonetic pronunciations associated with each of the characters of the alphabet of the second language; (b) storing the transliteration database in computer readable memory; (c) inputting a word in the first language, the word including at least one of the characters of the alphabet associated with the first language; (d) storing the word in the first language in the computer readable memory; (e) generating a phonetic representation of the word in the first language, where the phonetic representation includes the phonetic data representing the phonetic pronunciation of each character of the alphabet of the first language associated with the word; (f) comparing the phonetic representation of the word in the first language with corresponding phonetic data of the second language to generate a phonetic equivalent of each character of the word in the alphabet of the second language; (g) visually displaying the word in the first language; (h) embedding a visual representation of the phonetic equivalent of each character of the word in the second language adjacent the respective displayed character in the first language to form a representation of the word in a transliteration font; (i) storing the representation of the word in the transliteration font in the computer readable memory; and (j) displaying the word in the transliteration font.

Preferably, the transliteration database includes a number of data sets greater than two, thus allowing the user to first select a language to be transliterated and then set the selected language to be transliterated as the first language. The user then selects a language for phonetic representation, with the selected language for phonetic representation being set as the second language.

These and other features of the present invention will become readily apparent upon further review of the following specification and drawings.

These and other features of the present invention will become readily apparent upon further review of the following specification and drawings.

DETAILED DESCRIPTION OF THE PREFERRED EMBODIMENTS

Figure 1:
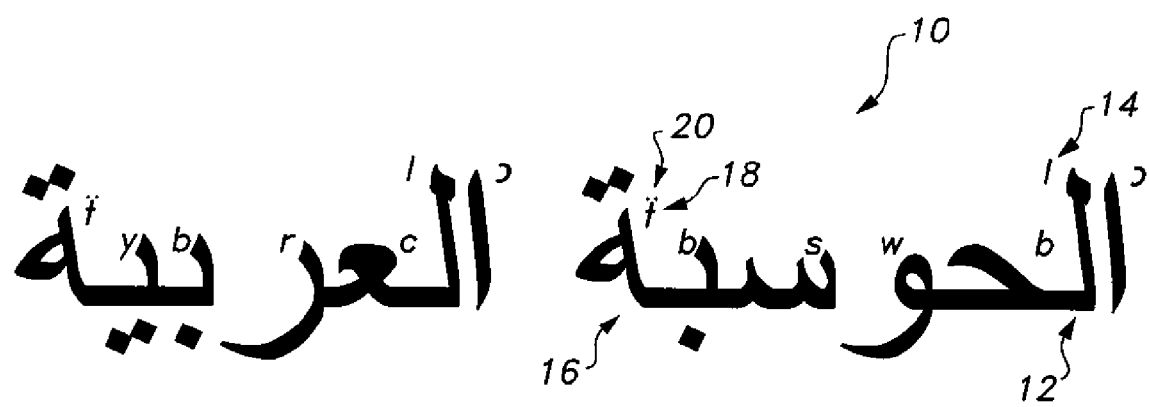
FIG. 1 is an example of displayed transliterated words generated by a method of generating a transliteration font according to the present invention.

As illustrated in FIG. 1, the method of generating a transliteration font relates to the generation of a word in a transliteration font. In FIG. 1, a set of exemplary words 10 are shown displayed in the transliteration font. In general, a word including at least one character is displayed in an alphabet of a first language, and using the transliteration font, the displayed word further includes at least one embedded character representing a phonetic pronunciation of the word in an alphabet of a second language.

In the example of FIG. 1, the first language is Arabic, and the individual characters of the Arabic words are displayed in the Arabic alphabet. A first Arabic character is represented generally at 12 in FIG. 1, and an English character 14 is also displayed slightly above the Arabic character 12. The English character 14 provides the phonetic pronunciation of the Arabic character 12 to a reader of English. It should be understood that the selection of Arabic as the first language and the selection of English as the second language are shown in FIG. 1 for exemplary purposes only, and that any desired languages and corresponding character sets may be used.

With regard to the second Arabic character 16 indicated in FIG. 1, the second English character 18 includes additional phonetic pronunciation markings (in this case, in the form of an umlaut 20). It should be understood that the characters of the second language that are embedded in the words of the first language are intended to provide phonetic pronunciation cues to the viewer, and thus include any desired or necessary additional visual indicators or markings, such as umlauts, accent marks, etc.

The method for generating the transliteration font, as illustrated in the example of FIG. 1, includes the following steps: (a) generating a transliteration database including at least first and second data sets, where the first data set includes graphic representations of characters of an alphabet of the first language and phonetic data representing phonetic pronunciations associated with each of the characters of the alphabet of the first language, and the second data set includes graphic representations of characters of an alphabet of a second language and phonetic data representing phonetic pronunciations associated with each of the characters of the alphabet of the second language; (b) storing the transliteration database in computer readable memory; (c) inputting a word in the first language, the word including at least one of the characters of the alphabet associated with the first language; (d) storing the word in the first language in the computer readable memory; (e) generating a phonetic representation of the word in the first language, where the phonetic representation includes the phonetic data representing the phonetic pronunciation of each character of the alphabet of the first language associated with the word; (f) comparing the phonetic representation of the word in the first language with corresponding phonetic data of the second language to generate a phonetic equivalent of each character of the word in the alphabet of the second language; (g) visually displaying the word in the first language; (h) embedding a visual representation of the phonetic equivalent of each character of the word in the second language adjacent the respective displayed character in the first language to form a representation of the word in a transliteration font; (i) storing the representation of the word in the transliteration font in the computer readable memory; and (j) displaying the word in the transliteration font.

Preferably, the transliteration database includes a number of data sets greater than two, thus allowing the user to first select a language to be transliterated and then set the selected language to be transliterated as the first language. The user then selects a language for phonetic representation, and the selected language for phonetic representation is set as the second language.

Additionally, as shown in FIG. 1, the characters in the first language preferably are displayed in a font size that is greater than that of the phonetic characters of the second language, thus allowing a reader of the first language to read the words printed in the transliteration font without the characters in the first language being obscured by the phonetic characters in the second language. For similar reasons, the phonetic characters of the second language are also preferably positioned above and adjacent to the corresponding characters in the first font (as shown in FIG. 1).

Figure 2:
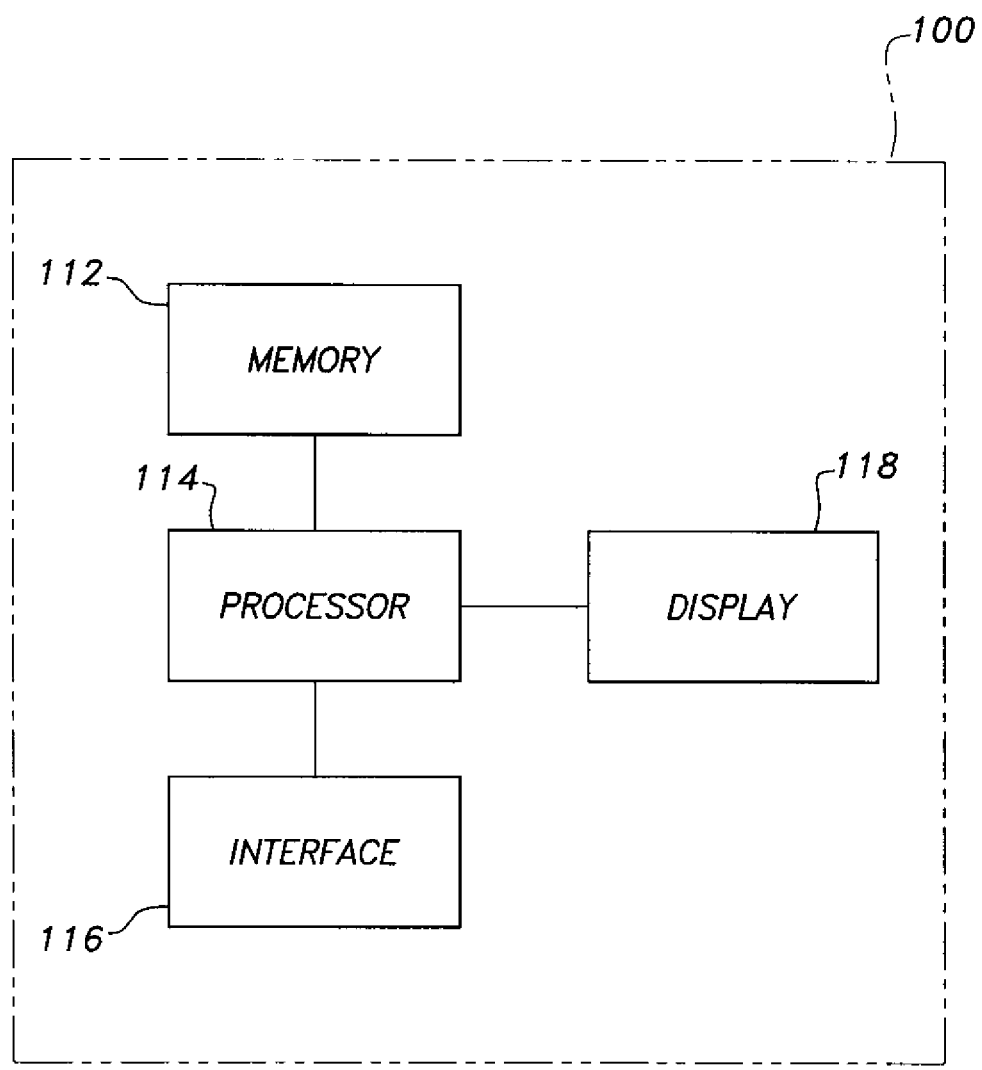
FIG. 2 is a block diagram illustrating system components for implementing the method of generating a transliteration font according to the present invention.

It should be understood that the processing may be performed by any suitable computer system, such as that diagrammatically shown in FIG. 2. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of generating a transliteration font, comprising the steps of:
   (a) generating a transliteration database including at least first and second data sets, the first data set including graphic representations of characters of an alphabet of a first language and phonetic data representing phonetic pronunciations associated with each of the characters of the alphabet of the first language, the second data set including graphic representations of characters of an alphabet of a second language and phonetic data representing phonetic pronunciations associated with each of the characters of the alphabet of the second language;
   (b) storing the transliteration database in computer readable memory;

(c) inputting a word in the first language, the word including at least one of the characters of the alphabet associated with the first language;
(d) storing the word in the first language in the computer readable memory;
(e) generating a phonetic representation of the word in the first language, the phonetic representation including the phonetic data representing the phonetic pronunciation of each of the characters of the alphabet of the first language associated with the word;
(f) comparing the phonetic representation of the word in the first language with corresponding phonetic data of the second language to generate a phonetic equivalent of each of the characters of the word in the alphabet of the second language;
(g) visually displaying the word in the first language;
(h) embedding a visual representation of the phonetic equivalent of each of the characters of the word in the second language directly adjacent each respective displayed character in the first language to form a representation of the word in a transliteration font, wherein the visual representation of the phonetic equivalent of each of the characters is embedded within a visual field of each respective displayed character in the first language and within a visual field of the word;
(i) storing the representation of the word in the transliteration font in the computer readable memory; and
(j) displaying the word in the transliteration font.

2. The computerized method of generating a transliteration font as recited in claim 1, wherein the transliteration database includes a number of data sets greater than two, the computerized method of generating a transliteration font further comprising the steps of:
selecting a language to be transliterated;
setting the selected language to be transliterated as the first language;
selecting a language for phonetic representation; and
setting the selected language for phonetic representation as the second language.

3. The computerized method of generating a transliteration font as recited in claim 1, wherein the embedded visual representation of the phonetic equivalent of each said character of the word in the second language has a font size smaller than a font size of the displayed word in the first language.

4. The computerized method of generating a transliteration font as recited in claim 3, wherein the embedded visual representation of the phonetic equivalent of each said character of the word in the second language is positioned above the corresponding character in the first language.

5. The computerized method of generating a transliteration font as recited in claim 1, wherein the first language is Arabic.

6. The computerized method of generating a transliteration font as recited in claim 5, wherein the second language is English.

7. A system for generating a transliteration font, comprising:
a processor;
computer readable memory coupled to the processor;
a user interface coupled to the processor;
software stored in the computer readable memory and executable by the processor, the software having:
means for generating a transliteration database including at least first and second data sets, said first data set including graphic representations of characters of an alphabet of a first language and phonetic data representing phonetic pronunciations associated with each of the characters of the alphabet of the first language, said second data set including graphic representations of characters of an alphabet of a second language and phonetic data representing phonetic pronunciations associated with each of the characters of the alphabet of the second language;
means for storing the transliteration database in the computer readable memory;
means for inputting a word in the first language, the word including at least one of the characters of the alphabet associated with the first language;
means for storing the word in the first language in the computer readable memory;
means for generating a phonetic representation of the word in the first language, the phonetic representation including the phonetic data representing the phonetic pronunciation of each of the characters of the alphabet of the first language associated with the word;
means for comparing the phonetic representation of the word in the first language with corresponding phonetic data of the second language to generate a phonetic equivalent of each of the characters of the word in the alphabet of the second language;
means for visually displaying the word in the first language;
means for embedding a visual representation of the phonetic equivalent of each of the characters of the word in the second language directly adjacent each respective displayed character in the first language to form a representation of the word in a transliteration font, wherein the visual representation of the phonetic equivalent of each of the characters is embedded within a visual field of each respective displayed character in the first language and within a visual field of the word;
means for storing the representation of the word in the transliteration font in the computer readable memory; and
means for displaying the word in the transliteration font.

8. The system for generating a transliteration font as recited in claim 7, wherein the transliteration database includes a number of data sets greater than two, the software stored in the computer readable memory and executable by the processor further having:
means for selecting a language to be transliterated;
means for setting the selected language to be transliterated as the first language;
means for selecting a language for phonetic representation; and
means for setting the selected language for phonetic representation as the second language.

9. The system for generating a transliteration font as recited in claim 7, wherein the embedded visual representation of the phonetic equivalent of each said character of the word in the second language has a font size smaller than a font size of the displayed word in the first language.

10. The system for generating a transliteration font as recited in claim 9, wherein the embedded visual representation of the phonetic equivalent of each said character of the word in the second language is positioned above the corresponding character in the first language.

11. The system for generating a transliteration font as recited in claim 7, wherein the first language is Arabic.

12. The system for generating a transliteration font as recited in claim 11, wherein the second language is English.

13. A computer software product that includes a non-transitory storage medium readable by a processor, the non-transitory storage medium having stored thereon a set of instructions for generating a transliteration font, the instructions comprising:

(a) a first sequence of instructions which, when executed by the processor, causes the processor to generate a transliteration database including at least first and second data sets, said first data set including graphic representations of characters of an alphabet of a first language and phonetic data representing phonetic pronunciations associated with each of the characters of the alphabet of the first language, said second data set including graphic representations of characters of an alphabet of a second language and phonetic data representing phonetic pronunciations associated with each of the characters of the alphabet of the second language;

(b) a second sequence of instructions which, when executed by the processor, causes the processor to store the transliteration database in computer readable memory;

(c) a third sequence of instructions which, when executed by the processor, causes the processor to accept input of a word in the first language, the word including at least one of the characters of the alphabet associated with the first language;

(d) a fourth sequence of instructions which, when executed by the processor, causes the processor to store the word in the first language in the computer readable memory;

(e) a fifth sequence of instructions which, when executed by the processor, causes the processor to generate a phonetic representation of the word in the first language, the phonetic representation including the phonetic data representing the phonetic pronunciation of each of the characters of the alphabet of the first language associated with the word;

(f) a sixth sequence of instructions which, when executed by the processor, causes the processor to compare the phonetic representation of the word in the first language with corresponding phonetic data of the second language to generate a phonetic equivalent of each of the characters of the word in the alphabet of the second language;

(g) a seventh sequence of instructions which, when executed by the processor, causes the processor to visually display the word in the first language;

(h) an eighth sequence of instructions which, when executed by the processor, causes the processor to embed a visual representation of the phonetic equivalent of each of the characters of the word in the second language directly adjacent each respective displayed character in the first language to form a representation of the word in a transliteration font, wherein the visual representation of the phonetic equivalent of each of the characters is embedded within a visual field of each respective displayed character in the first language and within a visual field of the word;

(i) a ninth sequence of instructions which, when executed by the processor, causes the processor to store the representation of the word in the transliteration font in the computer readable memory; and (j) a tenth sequence of instructions which, when executed by the processor, causes the processor to display the word in the transliteration font.

14. The computer software product as recited in claim 13, wherein the first language is Arabic.

15. The computer software product as recited in claim 14, wherein the second language is English.

* * * * *